(12) United States Patent
Machado et al.

(10) Patent No.: US 11,130,509 B2
(45) Date of Patent: Sep. 28, 2021

(54) SYSTEM AND METHOD FOR DETECTING A BREAK IN A RAILWAY TRACK

(71) Applicants: Rumo Logística Operadora Multimodal S.A., Santos (BR); Ricci Eletrônica Ltda, Curitiba (BR)

(72) Inventors: Márcio do Nascimento Machado, Jesuítas (BR); Eder Linconl Batistela Ricci, Cascavel (BR)

(73) Assignees: RUMO SA, Santos (BR); Ricci Eletrônica Ltda, Curitiba (BR)

( * ) Notice: Subject to any disclaimer, the term of this patent is extended or adjusted under 35 U.S.C. 154(b) by 360 days.

(21) Appl. No.: 16/212,350

(22) Filed: Dec. 6, 2018

(65) Prior Publication Data
US 2019/0193762 A1 Jun. 27, 2019

(30) Foreign Application Priority Data
Dec. 6, 2017 (BR) .......................... 102017026315-0

(51) Int. Cl.
| | |
|---|---|
| *B61L 23/04* | (2006.01) |
| *B61L 1/18* | (2006.01) |
| *B61L 3/24* | (2006.01) |
| *B61L 15/00* | (2006.01) |
| *B61L 21/10* | (2006.01) |
| *B61L 23/16* | (2006.01) |

(52) U.S. Cl.
CPC ............. *B61L 23/044* (2013.01); *B61L 1/187* (2013.01); *B61L 3/243* (2013.01); *B61L 15/0027* (2013.01); *B61L 21/10* (2013.01); *B61L 23/166* (2013.01); *B61L 2205/04* (2013.01); *G01N 2291/2623* (2013.01)

(58) Field of Classification Search
CPC ...... B61L 23/044; B61L 23/166; B61L 1/187; B61L 3/243; B61L 15/0027; B61L 21/10; B61L 2205/04; G01N 2291/2623
See application file for complete search history.

(56) References Cited

U.S. PATENT DOCUMENTS

| | | | | |
|---|---|---|---|---|
| 4,886,226 A | * | 12/1989 | Frielinghaus | ......... B61L 23/041 246/121 |
| 5,680,054 A | * | 10/1997 | Gauthier | ............... B61L 23/044 246/121 |
| 6,779,761 B2 | * | 8/2004 | Holgate | ................ B61L 23/044 246/122 R |
| 6,895,362 B2 | * | 5/2005 | Davenport | ............ B61L 23/041 246/120 |
| 7,268,565 B2 | * | 9/2007 | Anderson | ............... B61L 1/181 246/121 |

(Continued)

*Primary Examiner* — Jason C Smith
(74) *Attorney, Agent, or Firm* — Armstrong Teasdale LLP (57) ABSTRACT

The present invention refers to a method for detecting a break in a railway track, system for detecting a break in a railway track (1) and device for detecting a break in a railway track (500), in which a first track (101) and a second track (102) are connected defining measuring sections (302, 303) and electrical detection networks (M1, M2), in which a device for detecting a break in a railway track (500) is coupled to said tracks (101, 102) and arranged to measure at least one electrical parameter of at least one electrical detection network (M1, M2) and selectively promote an output (502) that indicates a state of at least one track (101, 102).

16 Claims, 6 Drawing Sheets

(56) References Cited

U.S. PATENT DOCUMENTS

| | | | | |
|---|---|---|---|---|
| 2002/0113170 | A1* | 8/2002 | Grappone | B61L 23/044 246/120 |
| 2013/0284859 | A1* | 10/2013 | Polivka | B61L 1/188 246/34 R |
| 2015/0051792 | A1* | 2/2015 | Kristen | B61L 99/00 701/34.2 |
| 2015/0053827 | A1* | 2/2015 | Noffsinger | B61L 23/044 246/121 |
| 2016/0075356 | A1* | 3/2016 | Kull | B61L 23/044 246/121 |
| 2016/0107664 | A1* | 4/2016 | Kull | B61L 23/044 246/121 |
| 2016/0194012 | A1* | 7/2016 | Matthews | B61L 3/10 246/121 |
| 2016/0244078 | A1* | 8/2016 | Noffsinger | B61L 3/10 |
| 2018/0327008 | A1* | 11/2018 | Kindt | B61L 25/025 |
| 2019/0086364 | A1* | 3/2019 | Hay | B61L 23/044 |
| 2019/0193761 | A1* | 6/2019 | Weingartner | B61L 23/00 |
| 2019/0193762 | A1* | 6/2019 | Machado | B61L 15/0027 |
| 2019/0300032 | A1* | 10/2019 | Asuka | B61L 27/0088 |
| 2020/0103223 | A1* | 4/2020 | Smith | B61K 9/08 |

* cited by examiner

SYSTEM AND METHOD FOR DETECTING A BREAK IN A RAILWAY TRACK

This application claims priority under 35 USC 119 to Brazilian Patent Application No. BR102017026315-0 filed Dec. 6, 2017 (Jun. 12, 2017), and the entire disclosure of said Brazilian application is hereby incorporated by reference in its entirety into the present specification.

The present invention refers to a method for detecting a break in a railway track, in which stages are described to indicate a state of at least one track of a certain section to be monitored. The present invention also refers to a system for detecting a break in a railway track and its respective components and also to a device for detecting a break in a railway track used in the present method and system.

DESCRIPTION OF THE STATE OF THE ART

On a daily basis, railway operators are subject to breaks in the tracks forming the railway networks. These breaks may occur for various reasons, particularly including defects in the tracks, sharp variations in temperature, defects in sleepers and variations in the characteristics of the ground on which the tracks are laid.

If undetected, a broken track will inevitably lead to the derailing of a train, wagons, locomotive, etc., such that every composition will be compromised. In addition to financial losses, there is also a risk to the environment, as the possibility of damage to the environment due to various factors, such as, for example, contamination of the soil, water tables, rivers, fauna and flora is highly likely.

Further, being large-scale accidents, there is a real likelihood of loss of human life involving workers, passengers and even passers-by, pedestrians or residents of regions close to the train tracks.

In this scenario, some techniques have been developed to detect breaks in railway network tracks which comprise two main techniques, namely: by continuous current track circuit, by audio-frequency track circuit and by way of fiber optics technologies.

Detecting a broken track utilizing continuous current track circuit is implemented by applying current at one of the ends of the target section of detection and monitoring this current at the other end, with specific equipment such as relays and voltage detection circuitry.

However, this technique requires that sections chosen for monitoring be isolated from each other. This is achieved with the addition of components called insulating splints, which prevent the current applied to the tracks of a section from being diverted to other sections.

However, it is noted that the points on which the insulating splints are installed means the electrical resistance of the tracks is altered. Furthermore, the mechanical resistance of the tracks is also affected because to install said splints, the tracks are cut (separated into sections) and the splints are fastened on their sides.

Besides their relatively short useful life, these splints have high implantation cost and also require periodic maintenance, which may require partial or total blockage of the railway network of which the section is a part.

Additionally, it is noted that in the continuous current track circuits the consumption of electric power is very high. Therefore, deficiency makes it unfeasible to power the circuitry by using solar panels or batteries.

In other words, the solution described above does not comprise an easy-to-install device, that presents low consumption of electric power and that does not depend on the installation of additional components that may adversely affect the reading of electrical parameters of the section to be monitored.

In turn, detecting a broken track with audio-frequency track circuit is implemented by applying an alternating current at one of the ends of the target section of detection and monitoring this current at the opposite end by way of a voltage detector circuit, which is tuned to the frequency of the generator used, which is situated in an audio range audible by a human.

Although it does not require electrical insulation of the tracks by way of insulating splints as described previously, this technique is limited by the length of the section to be monitored, because detection becomes inaccurate and unfeasible in sections over 2500 km in length.

Circuits are used for insulation between sections, consisting of inducers and enablers (LC circuits), tuned to the same frequency as the generator. So the installation of this type of component proves laborious and expensive, as there is a need to tune the insulating circuit to the frequency generator.

Moreover, the energy consumption of this type of circuit is very high, rendering it unfeasible to apply this technique utilizing the circuitry powered by way of solar panels or batteries.

Therefore, the solution described above is not easy to install, nor does it present low consumption of electric power and depends on the installation of additional components which limit the use of the circuit for certain lengths of sections monitored.

Another possible technique to detect a break in railway tracks comprises the use of fiber optics. In this case, detecting a break in the railway tracks is carried out based on capturing audio by the fiber optic cables used.

Accordingly, the cabling technology used and the implementation thereof are too expensive. The cabling must be buried at a certain depth along the section to be monitored and the place that will receive said cabling must not be shared with other data communication fibers.

Furthermore, the fiber optics used in this application are highly sensitive and, for this reason, are often susceptible to capturing outside noise that adversely affects the detection of a sought-after break.

Therefore, considering the conditions that the fiber optics require, implementing this technology proves altogether laborious, and may even present inaccurate detections due to the manner in which the fiber optics detect a break in the tracks.

Accordingly, the state of the art does not have means for detecting a break in a railway track with low implementation cost that is easy to install and is not applied solely to sections of railway tracks of limited length.

In this scenario, with a view to overcoming the problems known in the state of the art and mentioned above, the present invention proposes a method for detecting a break in a railway track, which is implemented by way of the simple connection of a device for detecting a break in a railway track to the tracks forming the section to be monitored.

The method proposed comprises monitoring and periodic reading of parameters of said section and is implemented by using cables in the connection of the device for detecting a break in a railway track, which may have any length. Furthermore, cables are used to determine the sections to be monitored, such that these sections may be long lengths (approximately, but not limited to about 10 km).

Therefore, the implementation of said method enables the installation of the device far from noisy environments with undesirable vibrations, commonly caused by the passage of compositions with locomotives and wagons, in addition to having low energy consumption by monitoring and periodic reading of the section monitored.

Advantageously, the present invention also proposes a system for detecting a break in a railway track with low consumption of electric power, which monitors and periodically measures electrical parameters by way of components installed along railway tracks to be monitored.

Additionally, the present invention includes a device for detecting a break in a railway track, which consists of various specific components whereby enabling the detection of a break in a railway track in sections of any length and with low consumption of electric power.

OBJECTIVES OF THE INVENTION

A first objective of the present invention is to provide a method for detecting a break in a railway track.

A second objective of the present invention is to provide a method for detecting a break in a railway track that monitors and periodically reads parameters of a section to be monitored.

A third objective of the present invention is to provide a method for detecting a break in a railway track that is implemented by using cables in connecting the device for detecting a break in a railway track.

A fourth objective of the present invention is to provide a system for detecting a break in a railway track that monitors and periodically reads electrical parameters by way of components installed along railway tracks of any length to be monitored.

A fifth objective of the present invention is to provide a device for detecting a break in a railway track that enables the detection of a break in a railway track in long-length sections.

BRIEF DESCRIPTION OF THE INVENTION

The objectives of the present invention are achieved by means of a method for detecting a break in a railway track, which basically consists of defining the sections to be monitored and of coupling a device for detecting a break in a railway track to the tracks forming said section, wherein the device for detecting a break in a railway track will periodically monitor parameters of the section defined and selectively promote an output that indicates the state of at least one track of the section monitored.

Also addressed is a system for detecting a break in a railway track basically consisting of railway tracks of a section to be monitored, electrical networks that enable monitoring and reading electrical parameters, in which a device for detecting a break in a railway track performs the monitoring and reading of these parameters and promotes an output that indicates a state of at least one of the tracks that form the section monitored.

Also addressed is a device for detecting a break in a railway track that is electrically coupled a railway tracks of a section to be monitored, defining electrical detection networks and indicates a state of at least one of the tracks that form the section to be monitored, in which said device is an electronic machine arranged to measure electrical parameters, processing data measured and activates an output circuit which indicates the integrity or not of at least one railway track of the section monitored.

SUMMARY DESCRIPTION OF THE DRAWINGS

The present invention will now be described in further detail based on an example of an embodiment represented in the drawings. The drawings show.

DETAILED DESCRIPTION OF THE DRAWINGS

Initially, the present invention refers to a method for detecting a break in a railway track. As explained in further detail ahead, the proposed method is based on reading at least one electrical parameter relating to a railway network.

Figure 1:
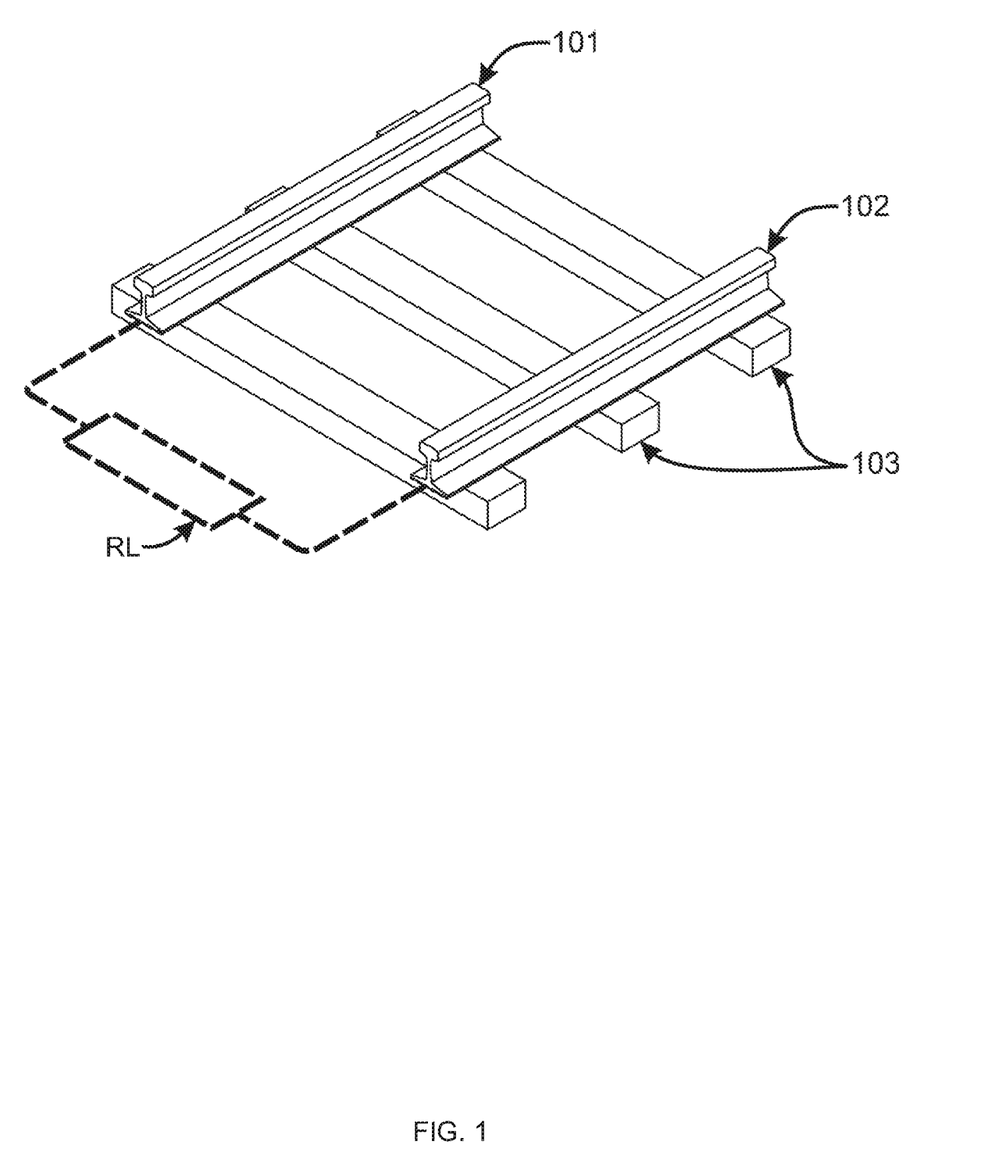
FIG. 1—is an example of a railway network section, in which tracks, sleepers and ballast resistance are represented.

More specifically, the present invention refers to a method for detecting a break in a railway track to be implemented in at least a section 302, 303 of railway network, such as the section exemplified in FIG. 1, comprising at least a first track 101, a second track 102 and sleepers 103.

These sleepers 103 should preferably be understood as parts or fixed crosspieces laid crosswise to the tracks 101, 102, which are disposed on said sleepers 103.

Preferably, the sleepers 103 are made of wood or concrete, but can also be made of other materials, such as metals in general or polymers, for example. So the composition of said sleepers 103 should not be understood as a limiting factor for the present invention.

However, if the sleepers 103 are made of materials that conduct electricity (such as the metals in general cited previously), said sleepers 103 should be electrically isolated of the tracks 101, 102.

As described in further detail ahead, the railway network section may further include a ballast resistance RL, which comprises an electrical resistance offered by an external environment in which the proposed method for detecting a break in a railway track is used.

Figure 3:
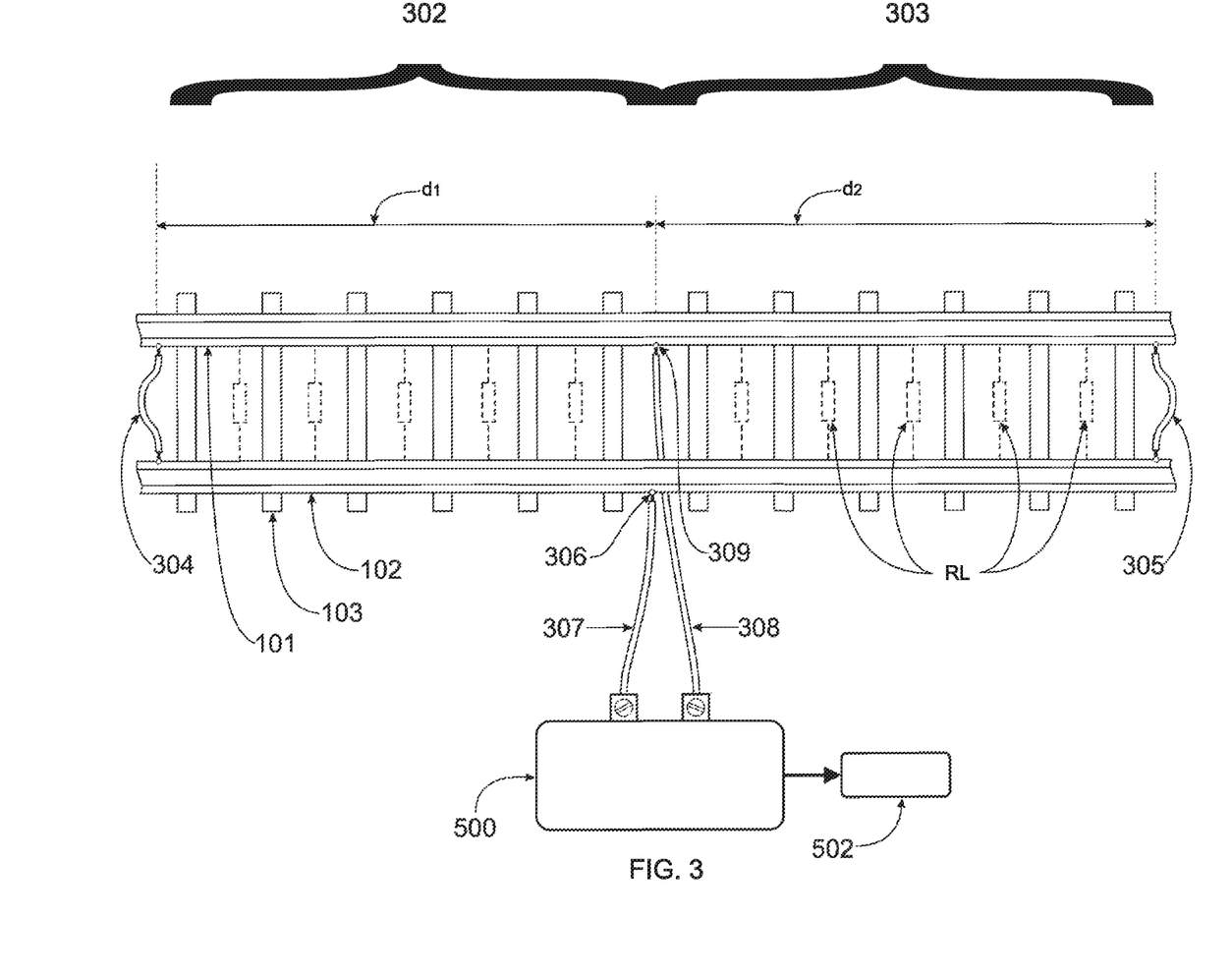
FIG. 3—is a representation of a railway network section over which there is applied the method of detecting a break in a railway track proposed and also which comprises the system for detecting a break in a railway track and the device for detecting a break in a railway track.

More specifically, the method for detecting a break in a railway track comprises a first stage of electrically connecting a first track 101 to a second track 102 by way of a first jumper 304, as illustrated in FIG. 3.

The first jumper 304 should preferably be understood as an electricity-conducting cable or wire, made of any material that conducts an electrical current, such as copper, gold, aluminum, silver, iron, tin, zinc, among others.

However, the composition of the first jumper 304 should not be understood as a limitation of the present invention, such that other materials may be used to make said jumper 304.

Furthermore, in an alternative arrangement, at least a sleeper 103 may be arranged such as a first jumper 304. In this arrangement, at least a sleeper 103 is made of material that conducts electricity such as proposed for said first jumper 304.

Similarly to the first stage described previously, the second stage of the present method also consists of electrically connecting the first track 101 to the second track 102, this connection being carried out by way of a second jumper 305 that is disposed distant from the first jumper 304, as illustrated in FIG. 3.

The second jumper 305 should also preferably be understood as an electricity-conducting cable or wire, made of any material that conducts an electrical current, such as the materials already mentioned for the first jumper 304.

The composition of the second jumper 305 should not be understood as a limitation of the present invention either, such that other materials may be used to make said jumper 305.

Furthermore, in an alternative arrangement, at least a sleeper 103 may also be arranged such as a second jumper 305. In this arrangement, at least a sleeper 103 is made of material that conducts electricity such as proposed for said second jumper 304.

Therefore, the sleepers 103 may be made both of a material that conducts electricity and of other materials, so as to present any distribution of sleepers for different compositions. More specifically, the sleepers 103 may, for example, be interspersed between a sleeper 103 made of material that conducts electricity and a sleeper 103 made of material that does not conduct electricity. Another possible arrangement is to dispose a sleeper 103 made of material that conducts electricity every two or more sleepers 103 made of material that does not conduct electricity.

In these alternative arrangements, at least a sleeper 103 made of material that conducts electricity is therefore arranged such as at least a jumper 304, 305.

In general terms, the sleepers 103 made of materials that conduct electricity are implemented preferably only at the beginning of a section to be monitored and at the end of this section.

Alternatively, it is possible to replace the jumpers 304, 305 by sleepers 103 made of materials that conduct electricity, such that the sleepers 103 are then arranged as said jumpers 304, 305. In this scenario, there can be no other short-circuits within the section that starts at the jumper 304, 305 (in this case, at least a sleeper 103) and ends at the remaining jumper 304, 305.

The third stage of the present method comprises electrically coupling a device for detecting a break in a railway track 500 at a first point 309 of the first track 101 and at a second point 306 of the second track 102.

Said coupling is preferably carried out by cables 307, 308, arranged as electricity conductors, but may alternatively be carried out by other means, such as by wires, sleepers 103, among others, such that the manner in which said coupling is carried out should not be understood as a limiting factor for the present invention.

If the sleepers 103 act alternatively as the coupling cited previously, it is noted that they should be made of materials that conduct electricity and must not short-circuit the tracks 101, 102.

Therefore, electrically coupling the device for detecting a break in a railway track 500 at the first point 309 of the first track 101 and at the second point 306 of the second track 102 is understood to be establishing an electrical contact between the device for detecting a break in a railway track 500 and the first and second tracks 101, 102, such that an electrical current can flow from said device 500 to the first and second tracks 101, 102.

Therefore, with the electrical coupling of the device for detecting a break in a railway track 500 in the first and second tracks 101, 102, there is established along the first track 101 and the second track 102 a first distance $d_1$ between the device for detecting a break in a railway track 500 and the first jumper 304.

Similarly, with the electrical coupling of the device for detecting a break in a railway track 500 in the first and second tracks 101, 102, there is established along the first track 101 and the second track 102 a second distance $d_2$ between the device for detecting a break in a railway track 500 and the second jumper 305.

The electrical coupling of the device for detecting a break in a railway track 500 in the first and second tracks 101, 102, as well as distances $d_1$ and $d_2$ are exemplified chiefly in FIG. 3.

The fourth stage of the present method comprises defining a first section 302 of the tracks 101, 102 to be monitored. Therefore, the first section 302 of the tracks 101, 102 to be monitored is comprised by distance $d_1$. In other words, the first section 302 comprises distance $d_1$ along the tracks 101, 102.

This stage also defines a first electrical detection network M1. Said electrical detection network M1 is comprised at least by the first section 302 of the tracks 101, 102, first jumper 304 and device for detecting a break in a railway track 500.

Similarly, the fifth stage of the present method comprises defining a second section 303 of the tracks 101, 102 to be monitored. Therefore, the second section 303 of the tracks 101, 102 to be monitored is comprised by distance $d_2$. In other words, the second section 303 comprises distance $d_2$ along the tracks 101, 102.

This stage also defines a second electrical detection network M2. Said electrical detection network M2 is comprised at least by the second section 303 of the tracks 101, 102, second jumper 305 and device for detecting a break in a railway track 500.

Figure 2:
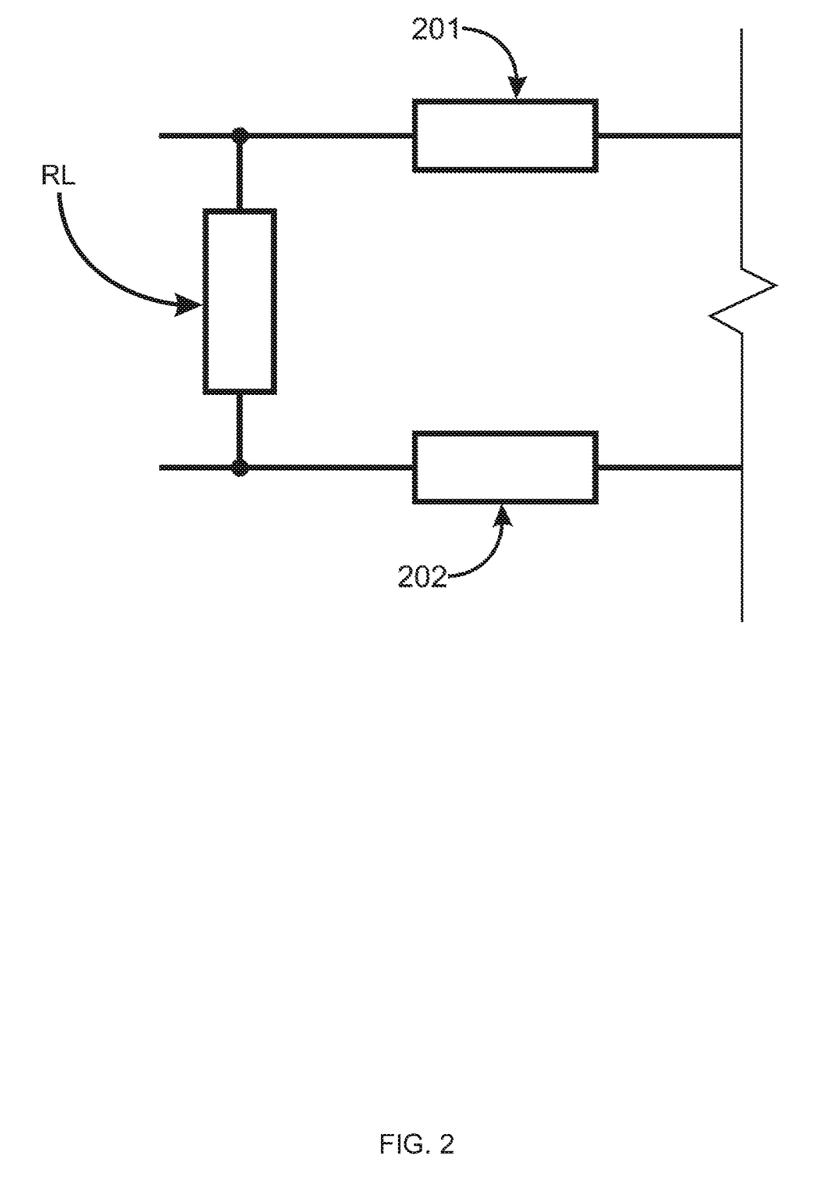
FIG. 2—is a representation of an electrical circuit equivalent to a railway network section such as the section exemplified in FIG. 1.

In an arrangement, the electrical detection networks M1, M2 are each electrically comprised by at least a first electrical resistance 201 relating to at least one of the sections 302, 303 of the first track 101, at least an electrical resistance 202 relating to one of the sections 302, 303 of the second track 102 and at least a ballast resistance RL, as shown chiefly in FIG. 2.

As described in further detail ahead, this ballast resistance RL comprises an electrical resistance offered by an external environment in which the method for detecting a break in a railway track is used.

It is worth pointing out that other components both for the sections 302, 303 and for the networks M1, M2 may be included. Other components may include, for example, other tracks, spacers and diverse components, among others.

Once sections 302, 303 and networks M1, M2 have been defined, a sixth stage of the present method can be carried out. This stage comprises the application of an electrical measuring current $i_m$ preferably at the first point 309 of the first track 101 by way of the device for detecting a break in a railway track 500.

However, alternatively, said electrical measuring current $i_m$ can be applied at another point of both the first track 101 and the second track 102 and also can be applied by other components, such as an external source.

With the application of said electrical measuring current $i_m$, there is measured in a seventh stage of the present method at least one electrical parameter of at least one from among a first electrical detection network M1 and a second electrical detection network M2.

In a preferred arrangement, it must be emphasized that this stage of reading at least one electrical parameter is carried out periodically, at a time interval between 0 and 60 seconds (1 minute). More specifically, the device for detecting a break in a railway track 500 reads at least one electrical parameter every 30 seconds, but this time interval (frequency) should not be understood as a limiting factor for the present invention. Accordingly, other time intervals may also be adopted.

An eighth stage of the present method consists of selectively promoting (enabling) an output 502 that indicates a state of at least one from among the first track 101 and the second track 102. The output 502 should be understood as any identification enabling an alert on the detection of the state of at least one of the tracks 101, 102, preferably though not exclusively including sound or visual identifications.

In a preferred arrangement, the output 502 comprises a serial port (such as, for example, port RS232) through which data are relayed to devices that announce the alarm. Furthermore, these data are also sent (routed) to a remote central which should preferably be understood as a remote supervisory system.

Accordingly, the device for detecting a break in a railway track 500 takes periodic readings described chiefly in the seventh stage of the present method. Accordingly, the result of the readings and other data are periodically sent to said remote supervisory system.

More specifically, the output 502 can be related, for example, to other devices that are capable of announcing the break of at least one of the tracks 101, 102. This announcement of a break in the track 101, 102 may occur for example, by way of messages, e-mails, horns, alarms, lights, LEDs, displays, mobile devices (cellphones, tablets, smartphones, radio, etc.).

These components receive data originating from the output 502 by at least one from among GSM (Global System for Mobile Communications), radiofrequency, fiber optics, telephony cables and satellite. However, it should be understood that other data transmission means may be used, including computer networks, different protocols and etc., and that, therefore, this is not a limiting characteristic for the present invention.

Moreover, the state of at least one from among the first track 101 and the second track 102 should preferably be understood as the integrity or situation of at least one of the tracks 101, 102, that is, if it is partially broken (splits, cracks, etc.), totally broken (severed) or is not broken.

However, in an alternative arrangement, the output 502 may also be promoted (enabled) in relation to other conditions of the tracks 101, 102, such as high temperature, presence or not of a composition passing through certain sections of a railway network, indication that the track 101, 102 is under maintenance, indication of the need for maintenance, among others.

It is also possible to detect the presence or absence of a composition (train, wagons, locomotive, etc.) in a certain section that is being monitored (sections 302, 303, for example), as well as other parameters such as the distance of this composition in relation to certain points (such as the first point 309 and the second point 306, for example), variation in temperature of the tracks 101, 102, among others.

As this is a preferred embodiment, the output 502 is promoted (enabled) if a value relating to at least a parameter measured exceeds at least a reference parameter stipulated by an operator, wherein both the parameter measured and the reference parameter are electrical resistance parameters, such that the electrical parameter measured is part of a total electrical resistance measured 401.

However, other parameters may also be used, such as electrical current, electrical voltage and electrical resistivity, for example. So the nature of the parameter measured should not be understood as a limiting factor for this invention.

Figure 4:
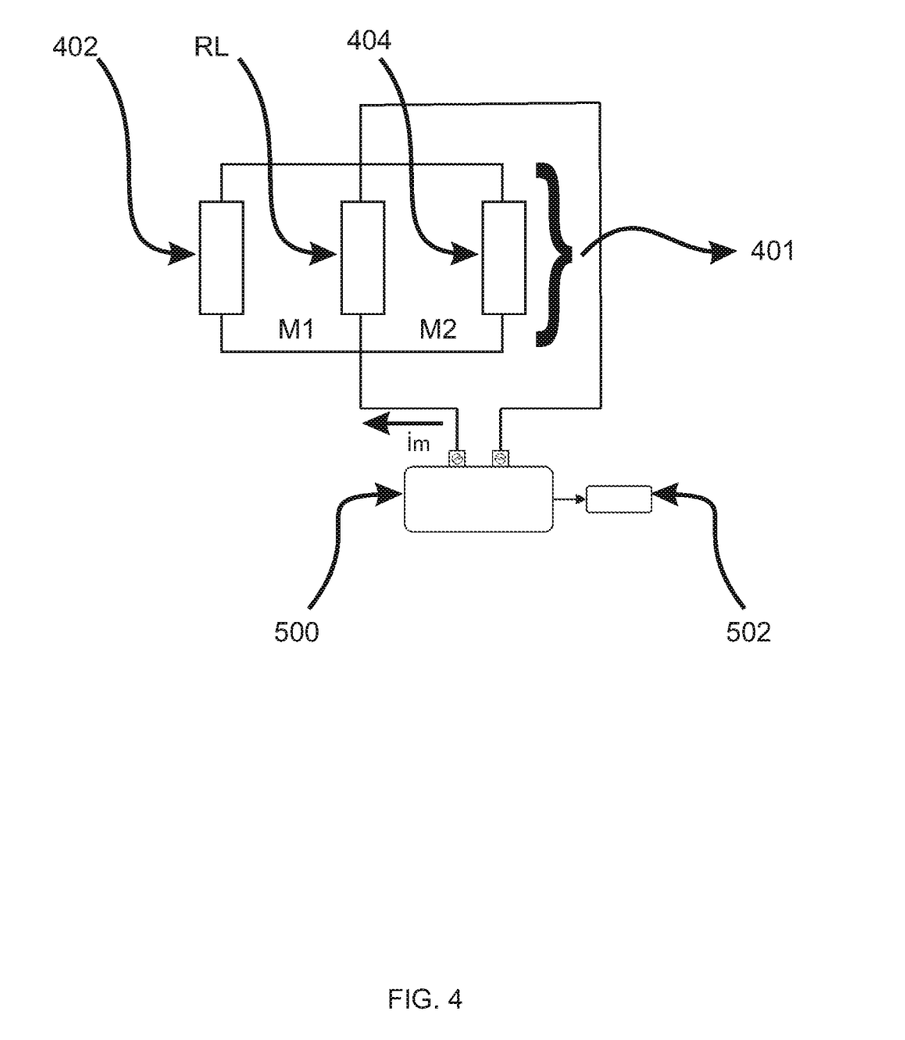
FIG. 4—is a representation of an electrical circuit equivalent to a railway network section such as a representation of FIG. 3.

The total electrical resistance measured 401 is, therefore, formed by at least one from among an equivalent electrical resistance 402 relating to the first electrical detection network M1, an equivalent second electrical resistance 404 relating to the second electrical detection network M2 and, as already mentioned, at least a ballast resistance RL, these resistances being preferably though not exclusively parallel to each other, as illustrated chiefly in FIG. 4. The electrical resistance of the cables 307, 308 can also be considered.

To illustrate the link between the resistances mentioned beforehand, FIG. 2 represents an equivalent electrical circuit relating to a railway network section such as the section exemplified in FIG. 1. In turn, FIG. 4 represents an equivalent electrical circuit to a railway network section such as the representation in FIG. 3.

In other words, the at least an electrical parameter measured and the at least an electrical reference parameter are electrical resistance parameters, wherein the output 502 is promoted (enabled) if a total electrical resistance measured 401 exceeds a reference electrical resistance previously stipulated by the operator.

This situation wherein a total electrical resistance measured 401 exceeds a reference electrical resistance occurs when at least one from among a first and a second electrical detection networks M1, M2 respectively is electrically open.

In other words, at least one from among a first and a second electrical detection networks M1, M2 respectively is electrically open when at least a component of said networks M1, M2 is unable to allow the passage of an electrical current via said network, that is, the output 502 is promoted (enabled) when at least a track 101, 102 or jumper 304, 305 is broken.

So in other words, the output 502 is preferably promoted (enabled) when at least a track 101, 102 is broken.

As mentioned, to perform said detection, an electrical measuring current $i_m$ is applied to at least one track 101, 102, subsequently at least one electrical parameter of at least one from among a first and second electrical detection networks M1, M2 is measured and the output 502 is promoted (enabled) or not according to this reading.

These stages are preferably performed by the device for detecting a break in a railway track 500. This device for detecting a break in a railway track 500 is arranged like an electronic machine and measures electrical resistances and provides an electrical measuring current $i_m$.

To illustrate this, the device for detecting a break in a railway track 500 provides an electrical measuring current $i_m$ of 6 A. A current of this magnitude enables immunity to the various types of interferences caused by the external environment and especially by the ground. Furthermore, said current enables resistances to be measured and detected with accuracy in the order of milliohms.

However, similar results can be obtained with currents of milliamps up to dozens of amps, such that the magnitude of the current used should not be a limiting factor for the present invention.

So the present invention proposes a method for detecting a break in a railway track which is implemented by way of the simples connection of a device for detecting a break in a railway track 500 to the tracks 101, 102 which form the section to be monitored, allowing said section to have varied lengths and obtaining excellent accuracy in the results obtained with the method proposed.

With special reference to FIG. 3, the present invention also proposes a system for detecting a break in a railway track 1, the system of detecting a broken railway track 1 comprising at least a first track 101, a second track 102, and sleepers 103. It is underlined that other components may also be part of the system 1 proposed.

In a preferred arrangement, the first track 101 is connected to the second track 102 by way of a first jumper 304 and by way of a second jumper 305, distant from the first jumper 304. A device for detecting a break in a railway track 500 is electrically coupled at a first point 309 of the first track 101 and at a second point 306 of the second track 102.

Therefore, there are established along the first track 101 and the second track 102 a first distance $d_1$ between the device for detecting a break in a railway track 500 and the first jumper 304, as well as a second distance $d_2$ between the device for detecting a break in a railway track 500 and the second jumper 305, also along the first track 101 and the second track 102.

Therefore distance $d_1$ defines a first section 302 of the tracks 101, 102 to be monitored and distance $d_2$ defines a second section 303 of the tracks 101, 102 to be monitored, as shown in FIG. 3.

In this sense, a first electrical detection network M1 is defined, comprising the first section 302 of the tracks 101, 102 to be monitored. More specifically, the first electrical detection network M1 is comprised by distance $d_1$, first jumper 304 and the device for detecting a break in a railway track 500.

Similarly, the second electrical detection network M2 is defined, comprising the second section 303 of the tracks 101, 102 to be monitored. More specifically, the second electrical detection network M2 is comprised by distance $d_2$, second jumper 305 and the device for detecting a break in a railway track 500.

In an arrangement, the electrical detection networks M1, M2 each electrically comprise at least a first electrical resistance 201 relating to one of the sections 302, 303 of the first track 101, at least an electrical resistance 202 relating to one of the sections 302, 303 of the second track 102 and at least a ballast resistance RL.

However, other components for both the sections 302, 303 and for the networks M1, M2 may be included. Other components may include, for example, other tracks, spacers and diverse components, among others.

As described in further detail ahead, this ballast resistance RL comprises an electrical resistance offered by an external environment in which the method for detecting a break in a railway track is used.

It is worth pointing out that other components for both the sections 302, 303 and for the networks M1, M2 may be included. Other components may include, for example, other tracks, spacers and diverse components, among others.

The device for detecting a break in a railway track 500 comprised in the system for detecting a break in a railway track 1 is arranged to apply an electrical measuring current $i_m$ at the first point 309.

Figure 5:
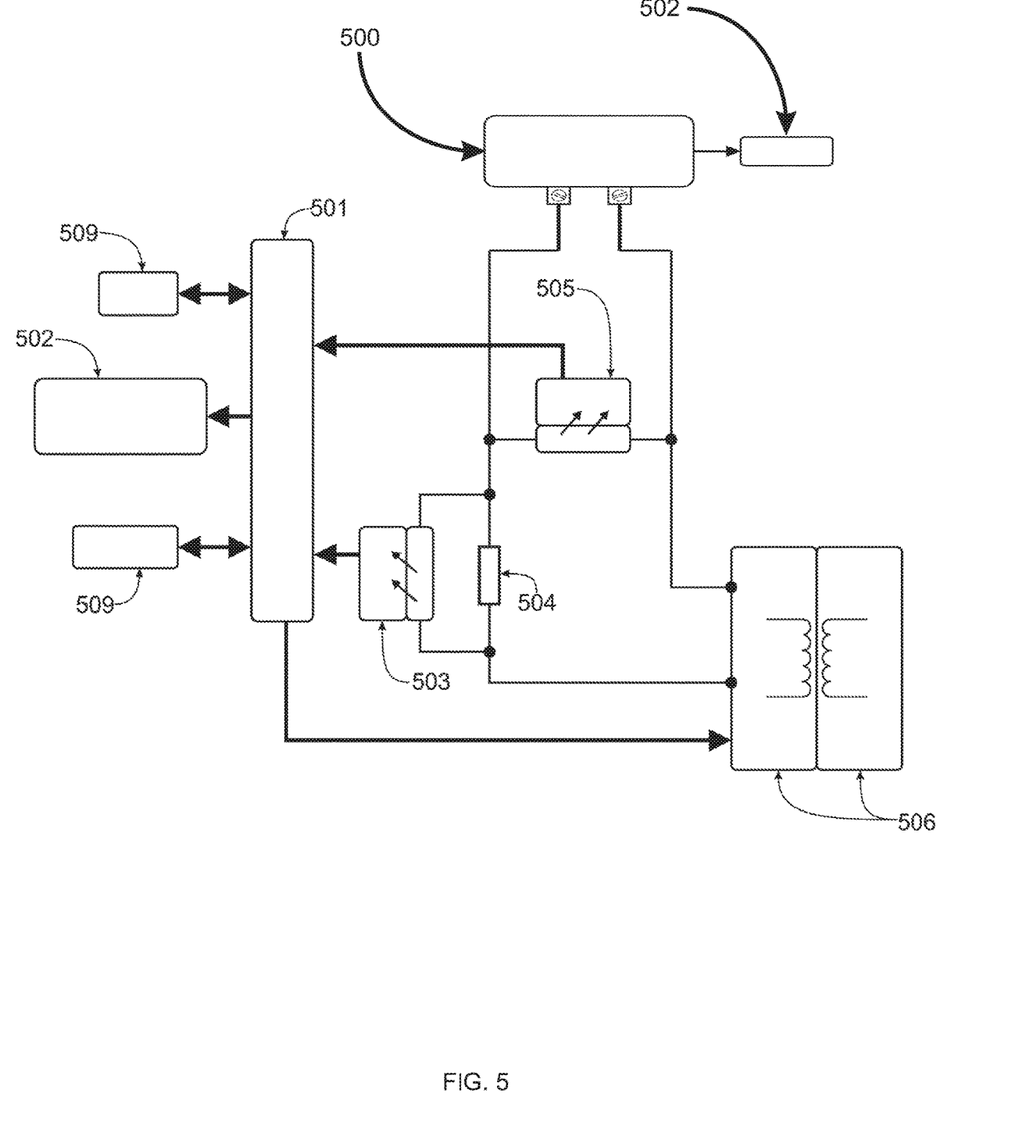
FIG. 5—is a representation of a block diagram that shows the main components of an arrangement of the device for detecting a break in a railway track proposed.

As described in further detail ahead, this supply is carried out by means of a power supply 506, preferably of the switching type.

The source 506 is preferably of the switching type having a high yield and also consequently providing a low consumption of electric power by the device for detecting a break in a railway track 500. It is noted that the source 506 is preferably a component that is part of the system now proposed and may alternatively be an outside source 506.

Furthermore, the device for detecting a break in a railway track 500 is also arranged to measure at least one electrical parameter of at least one from among a first electrical detection network M1 and a second electrical detection network M2 and selectively promote (enable) an output 502 that indicates a state of at least one from among the first track 101 and the second track 102.

In this sense, it is noted that the output 502 should be understood as any identification that enables an alert on the detection of the state of at least one of the tracks 101, 102, preferably though not exclusively including sound or visual identifications.

A mentioned beforehand, the state of at least one from among the first track 101 and the second track 102 should preferably be understood as the integrity or situation of at least one of the tracks 101, 102, that is, if it is partially broken (splits, cracks, etc.), totally broken (severed) or is not broken.

Alternatively, the output 502 may also be promoted (enabled) in relation to other conditions of the tracks 101, 102, such as high temperature, presence or not of a composition passing through certain sections of a railway network, indication that the track is under maintenance, indication of the need for maintenance, among others.

As this is a preferred embodiment, the output 502 is promoted (enabled) if a value relating to at least a parameter measured exceeds at least a reference parameter stipulated by an operator, wherein both the parameter measured and the reference parameter are electrical resistance parameters, such that the electrical parameter measured forms a total electrical resistance measured 401.

The total electrical resistance measured 401 is, therefore, formed by at least one from among an equivalent electrical resistance 402 relating to the first electrical detection network M1, an equivalent second electrical resistance 404 relating to the second electrical detection network M2, these resistances being preferably though not exclusively parallel to each other, as illustrated chiefly in FIG. 4. The electrical resistance of the cables 307, 308 may also be considered.

To illustrate the link between the resistances mentioned beforehand, FIG. 2 represents an equivalent electrical circuit relating to a railway network section such as the section exemplified in FIG. 1. In turn, FIG. 4 represents an equivalent electrical circuit to a railway network section such as a representation in FIG. 3.

In other words, the at least an electrical parameter measured and the at least an electrical reference parameter are electrical resistance parameters, wherein the output 502 is promoted (enabled) if a total electrical resistance measured 401 exceeds a reference electrical resistance previously stipulated by the operator.

This situation wherein a total electrical resistance measured 401 exceeds a reference electrical resistance occurs when at least one from among a first and a second electrical detection networks M1, M2 respectively is electrically open.

In other words, at least one from among a first and a second electrical detection networks M1, M2 respectively is electrically open when at least a component of said networks M1, M2 is unable to allow the passage of an electrical current via said network, that is, the output 502 is promoted (enabled) when at least one from among the tracks 101, 102 or jumpers 304, 305 is broken.

So in other words, the output 502 is preferably promoted (enabled) when at least a track 101, 102 is broken.

Therefore, as mentioned, to perform said detection, an electrical measuring current $i_m$ is applied to at least one track 101, 102, subsequently at least one electrical parameter of at least one from among a first and second electrical detection networks M1, M2 is measured and the output 502 is promoted (enabled) or not according to this reading.

Accordingly, the device for detecting a break in a railway track 500 is arranged like an electronic machine, wherein the device for detecting a break in a railway track 500 measures electrical resistances in a range of 0 to 1000 milliohms and provides an electrical measuring current $i_m$ of at least 1 A.

To illustrate this, the device for detecting a break in a railway track 500 provides an electrical measuring current $i_m$ of 6 A, to enable immunity to the various types of interferences caused by the external environment and especially by the ground. Furthermore, said current enables resistances to be measured and detected with accuracy in the order of milliohms, as already mentioned.

However, as explained previously, similar results can be obtained with electrical currents of other magnitudes, such as, for example, milliamps up to dozens of amps. Accordingly, it should be understood that the magnitude of the current used should not be a limiting factor for the present invention.

In order to provide the characteristics of the method and the system 1 proposed, the present invention further provides a device for detecting a break in a railway track 500 which, as already described, is electrically coupled to the tracks 101, 102, besides being a component of the electrical detection networks M1, M2.

This device for detecting a broken railway track 500 comprises at least a microcontroller 501, an internal memory 509, analogical to digital converters 503, 505, switching power supply 506 and a shunt resistor 504, such as exemplified in the block diagram of FIG. 5.

The said device 500 is arranged like an electronic machine, arranged to measure an electrical resistance and to provide an electrical measuring current $i_m$.

To exemplify a possible arrangement for the detector device of a broken railway track 500, it is arranged to measure an electrical resistance in a range of 0 to 1000 milliohms and to provide an electrical measuring current $i_m$ of at least 1 A. More specifically, the electrical measuring current $i_m$ provided is 6 A.

However, similar results can be obtained with electrical currents of other magnitudes, such as, for example, milliamps up to dozens of amps. Accordingly, it should be understood that the magnitude of the current used is not a limiting factor for the present invention.

The device 500 is also arranged to digitally process at least one electrical parameter of at least one from among a first electrical detection network M1 and a second electrical detection network M2, compare the at least an electrical parameter measured with at least an electrical reference parameter previously stored in the internal memory 509 and activate an output circuit 502 that indicates the integrity or not of a railway track 101, 102.

Specifically, the analogical to digital converter 503 is, jointly chiefly with the shunt resistor 504, responsible for measuring the electrical measuring current $i_m$. In turn, the analogical to digital converter 505 is primarily responsible for measuring a voltage applied to the tracks 101, 102.

In a preferred arrangement, both the analogical to digital converters 503, 505 have a resolution of 16 bits, increasing the accuracy of the readings on the scale of milliohms. Furthermore, said analogical to digital converters 503, 505 are electrically isolated from the other measuring components which are connected to the microcontroller 501. This characteristic prevents interference and decreases the chance of errors in the readings taken.

In this scenario, it is noted that alternatively the converters 503, 505 may present other resolutions, such as between 8 and 32 bits, for example. Since the higher the number of bits, the greater the resolution and consequently the greater the accuracy, it is understood that any resolution values may be used.

For a preferred arrangement of the present invention, 16 bits present satisfactory results, but does not exclude the implementation of different resolutions to this one.

As mentioned, the components of the device 500 arranged to take measurements or assist in carrying out the readings are electrically isolated from the components of the device 500 arranged to process or assist in processing the data previously measured.

So, preferably galvanic electrical insulation is provided which, besides insulating the components such as mentioned above, increases the immunity of the device for detecting a break in a railway track 500 against various external agents such as, for example, atmospheric electrical discharges.

Figure 6:
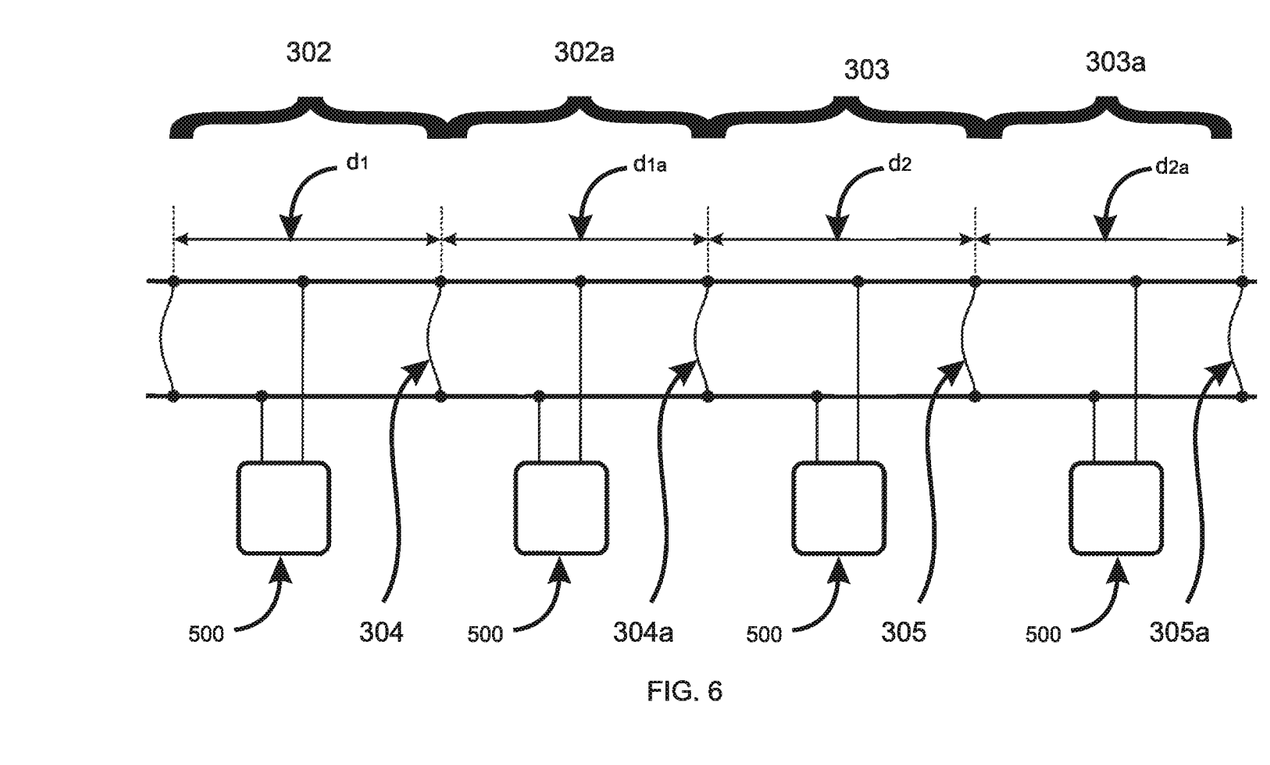
FIG. 6—is a representation of a section of a railway network endowed with various devices to detect a break in a railway track in a railway divided into various sections.

Moreover, said galvanic electrical insulation also neutralizes the interaction between earthing systems present when various devices to detect a break in a railway track 500 are linked in consecutive sections, as illustrated in FIG. 6.

Furthermore, FIG. 6 exemplifies a division of the railway into various sections 302, 302a, 303, 303a, jumpers 304, 304a, 305, 305a and corresponding distances $d_1$, $d_{1a}$, $d_2$, $d_{2a}$, as well as a plurality of devices 500. However, this characteristic should not be understood as a limiting factor for the first invention, since a plurality of devices 500 can be implemented in various sections along the railway.

As already stated above, the block responsible for providing the electrical measuring current $i_m$ is a switching power supply 506. This current $i_m$ is preferably applied periodically and at a certain time interval, such that it is constantly applied every time interval.

In other words, every time interval preset by the operator, the electrical measuring current $i_m$ will be applied for a certain amount of time, also defined by an operator. So, an application frequency of the electrical measuring current $i_m$ is established.

In this scenario, the microcontroller 501, with the values furnished by the analogical to digital converters 503, 505 controls the voltage of the source 506 with the objective of adjusting the reading current $i_m$ until it stabilizes.

Once the current $i_m$ is stabilized, readings are taken by the analogical to digital converters 503, 505. Thereafter, the microcontroller 501 calculates a value of a total electrical resistance measured 401, preferably dividing the voltage applied to the track by the value of the current $i_m$.

However, it is noted that the value of a total electrical resistance measured 401 can also be calculated by way of other relationships between various magnitudes and, accordingly, this should not be understood as a limiting characteristic for the present invention.

Thereafter, the value of the total electrical resistance measured 401 is compared to the value of a reference electrical resistance previously defined by the operator. If the value of the total electrical resistance measured 401 is higher than the value of the electrical resistance reference, the microcontroller 501 prints in the output circuit 502 the indication of a broken track.

In this scenario, different parameters may be alternatively measured by the present device 500, such that reading electrical resistance values should not be understood as a limiting factor for the present invention.

Accordingly, the device 500 will enable the output 502 whenever a parameter measured is higher than a parameter stipulated, be they electrical parameters (electrical resistance, for example) or other parameters.

In order to exemplify an implementation of the method for detecting a break in a railway track, system for detecting a break in a railway track 1 and use of a device for detecting a break in a railway track 500, an example such as the one set forth ahead is described.

Example 1

In this example, the distances of 6 km in relation to the illustration of FIG. 3 are considered, wherein $d_1=d_2=3$ km. Furthermore, it is considered that the track 101, 102 used has a resistance characteristic of 80 micro-ohm/m.

Therefore:

Resistance of the segment 302=80*3000=240000micro-ohm=240milliohms.

Resistance of the segment 303=80*3000=240000micro-ohm=240milliohms.

For the ballast resistance RL, the two worst cases according to table 1 are considered: wet ground (2000 ohm/meter) and dry ground (80000 ohm/meter).

Wet ground:

Ballast resistance RL 403=2000/3000=0.666 ohm=666mohm.

Using the mathematical formula for electrical resistances in parallel, with the ballast resistance for wet ground, then:

Total electrical resistance measured 401=240//240//666=101milliohm

Dry ground:

Ballast resistance RL 403=80000/3000=26.666 ohm=26666mohm.

Using the mathematical formula for electrical resistances in parallel, with the ballast resistance for dry ground, then:

Total electrical resistance measured 401=240//240//26666=119milliohm.

If the segment 302 opens (track open near the first jumper 304), for example, the ballast resistance RL 403 will be in parallel with the resistance of the segment 303.

Accordingly:

Total electrical resistance measured 401 for wet ground=240//666=176mohms.

Total electrical resistance measured 401 for dry ground=240//26666=238mohms.

In order to illustrate this example, it is noted that table 3 shows the results of the calculations for the possible states.

In this example, when the two segments 302, 303 are electrically closed, that is, whole and unbroken, in the worst case considering dry ground, the total electrical resistance measured 401 will be 119 milliohm.

When one of the jumpers 304, 305 is electrically open, that is, broken, in the worst case considering wet ground, the total electrical resistance measured 401 will be 176 milliohm.

In this example, the device for detecting a broken railway track 500 will have in its memory 509 a value of 133 milliohm as reference value. The microcontroller compares this value and, in this case, emits an output 502 indicating broken track whenever the total electrical resistance measured 401 is greater than 133 milliohm.

Example 1 did not take into account the ohmic resistances of jumpers 304, 305 and of cables 307, 308.

Example 2

In complement to Example 1 above, certain possible conditions for implementing the present invention are given as examples. In this sense, the present invention may be successfully implemented in sections 302, 303 of 10 km, for example. Furthermore, considering, for example, regions with dry ground (such as the Northeastern region of Brazil) in railway networks that have sleepers 103 made of concrete, it is possible to monitor sections 302, 303 up to 100 km. Moreover, the device for detecting a break in a railway track 500 has a man-machine interface (MMI) that enables said device to be arranged to operate in various environments and diverse conditions.

It is noted that the distances used in the drawings are not limiting factors of the present invention and should be understood that the present invention is feasible in arrangements of sections 302, 303 with distances different to those illustrated.

In the same way, it is noted that the link of the device for detecting a break in a railway track 500 exactly in the middle of the section ($d_1=d_2$) should not be understood as an essential factor of the present invention, such that it can be feasibly implemented in sections having different dimensions.

In order to illustrate a possible arrangement for application of the present invention, electrical cables were used preferably but not exclusively which have ohmic resistance less than 2 milliohm/m, such as the cable gauge 7 AWG, which presents ohmic resistance of 1.7 milliohm/m.

Therefore, the present invention provides a method for detecting a break in a railway track and system 1 that advantageously enables sections of any length in a railway network are monitored preferably from electrical parameters of the tracks 101, 102 that form it, without being limited to certain lengths and without adversely affecting the reading and monitoring in long sections.

Also addressed is a device for detecting a break in a railway track 500 consisting of various specific components and which thus enable the detection of a break of at least one railway track 101, 102 in sections of any length and with low consumption of electric power.

Having described an example of a preferred embodiment, it should be understood that the scope of the present invention encompasses other possible variations, being limited solely by the content of the accompanying claims, potential equivalents being included therein.

The invention claimed is:

1. A method for detecting a break in a railway track, the method for detecting a break in a railway track, the method comprising the steps of:
   a) electrically connecting a first rail of the railway track to a second rail of the railway track using a first jumper;

b) electrically connecting the first rail to the second rail using a second jumper, the second jumper spaced from the first jumper;

c) electrically coupling a detection device to the first rail at a first point and to the second rail at a second point, defining a first distance between the detection device and the first jumper along the first rail and the second rail, and defining a second distance between the detection device and the second jumper along the first rail and the second rail;

d) defining a first section of the railway track to be monitored, the first section including the first distance of at least one of the first or second rail, and defining a first electrical detection network, including the first section of the railway track, the first jumper, and the detection device;

e) defining a second section of the railway track to be monitored, the second section including the second distance of at least one the first or second rail, and defining a second electrical detection network, including the second section of the tracks, the second jumper, and the detection device;

f) applying an electrical measuring current at the first point using the detection device;

g) measuring at least one electrical parameter of at least one of the first electrical detection network or the second electrical detection network; and h) selectively setting an output that indicates a state of at least one of the first rail or the second rail.

2. The method for detecting a break in a railway track according to claim 1, wherein the output is set when a value associated with the at least one measured electrical parameter exceeds an electrical reference parameter.

3. The method for detecting a break in a railway track according to claim 2, wherein the output is the set when the at least one measured electrical parameter including a measured value of a total electrical resistance exceeds the electrical reference parameter including a reference electrical resistance.

4. The method for detecting a break in a railway track according to claim 3, wherein the measured value of the total electrical resistance exceeds the reference electrical resistance when at least one of the first or the second electrical detection networks is electrically open.

5. The method for detecting a break in a railway track according to claim 4, wherein the steps (f), (g), and (h) are implemented using the detection device,
wherein the detection device includes an electronic machine configured to measure electrical resistances and provide an electrical measuring current.

6. The method for detecting a break in a railway track according to claim 5, wherein each of the first and second electrical detection networks further includes a respective ballast resistance, wherein the ballast resistance is an electrical resistance associated with an external environment around the railway track.

7. The method for detecting a break in a railway track according to claim 5, wherein the measured value of the total electrical resistance includes at least one of: (i) a first equivalent electrical resistance associated with the first electrical detection network, a second equivalent electrical resistance associated with the second electrical detection network, and a ballast resistance,
wherein the first and second electrical detection networks electrically include a first electrical resistance associated with at least one of the first or second section of the first rail, a second electrical resistance associated with at least one of the first or second section of the second rail, and a ballast resistance.

8. A system for detecting a break in a railway track the system comprising a first rail, a second rail, and sleepers,
wherein the first rail is connected to the second rail using a first jumper and a second jumper spaced from the first jumper,
wherein a detection device is electrically coupled to the first rail at a first point and to the second rail at a second point, defining a first distance between the detection device and the first jumper along the first rail and the second rail, and defining a second distance between the detection device and the second jumper along the first rail and the second rail, a first section of the railway track to be monitored including the first distance of at least one of the first rail or the second rail and a second section railway track to be monitored including the second distance of at least one of the first rail or the second rail,
wherein a first electrical detection network is defined between the first section of the railway track, the first jumper, and the detection device,
wherein a second electrical detection network is defined between the second section of the railway track, the second jumper and the detection device,
wherein the detection device is configured to apply an electrical measuring current at the first point, measure at least one electrical parameter of at least one of the first electrical detection network or the second electrical detection network, and selectively set an output that indicates a state of at least one of the first rail of the second rail.

9. The system for detecting a break in a railway track, according to claim 8, wherein the output is set when a value associated with at least one measured electrical parameter of at least of the first electrical detection network or the second electrical detection network exceeds an electrical reference parameter.

10. The system for detecting a break in a railway track, according to claim 9, wherein the at least one measured electrical parameter and the electrical reference parameter are electrical resistance parameters.

11. The system for detecting a break in a railway track, according to claim 10, wherein the output is set when the at least one measure electrical parameter including a measured value of a total electrical resistance exceeds the electrical reference parameter including a value of a reference electrical resistance.

12. The system for detecting a break in a railway track, according to claim 11, wherein the measured value of the total electrical resistance exceeds the reference electrical resistance when at least one of the first or the second electrical detection networks is electrically open.

13. The system for detecting a break in a railway track, according to claim 12, wherein the detection device comprises an electronic machine configured to measure electrical resistances and provide an electrical measuring current.

14. The system for detecting a break in a railway track, according to claim 12, wherein the detection device comprises at least a microcontroller, an internal memory, an analog to digital converter, a power supply and a shunt resistor, and wherein the detection device is configured to measure an electrical property of the railway track and selectively set the output by activating an output circuit that indicates the integrity of the railway track.

15. A device for detecting a break in a railway track, the device comprising at least a microcontroller, an internal memory, an analog to digital converter, a power supply, and a shunt resistor,
- wherein the device is electrically coupled a first point of to a first rail at a first point and to a second rail at a second point, defining a first distance between the device and a first jumper along the first rail and the second rail, and defining a second distance between the device and a second jumper along the first rail and the second rail,
- wherein the first is connected to the second using a first jumper and a second jumper, the second jumper spaced from the first jumper,
- wherein a first section of the railway track to be monitored includes the first distance of at least one of the first rail and the second rail, and a second section of the railway track to be monitored includes the second distance of at least one of the first rail and the second rail,
- wherein a first electrical detection network is defined a between the first section of the railway track, the first jumper, and the device,
- wherein a second electrical detection network is defined between the second section of the railway track, the second jumper, and the device,
- wherein the device is arranged is configured to apply an electrical measuring current at the first point, measure at least one electrical parameter of at least one of the first electrical detection network or the second electrical detection network, and selectively set an output that indicates a state of at least one of the first rail and the second rail.

16. The device for detecting a broken railway track, according to claim 15,
- configured to measure the at least one electrical parameter including an electrical resistance by applying the electrical measuring current, digitally process the at least one measure electrical parameter, compare the at least one measured electrical parameter to an electrical reference parameter previously stored in the internal memory, and selectively set the output by activating an output circuit that indicates the integrity of the railway track.

* * * * *